No. 887,222. PATENTED MAY 12, 1908.
J. PEARSON.
MEANS FOR AUTOMATICALLY CONTROLLING VOLTAGE AND POWER FACTOR OF GENERATORS OPERATING IN MULTIPLE.
APPLICATION FILED MAR. 1, 1906.
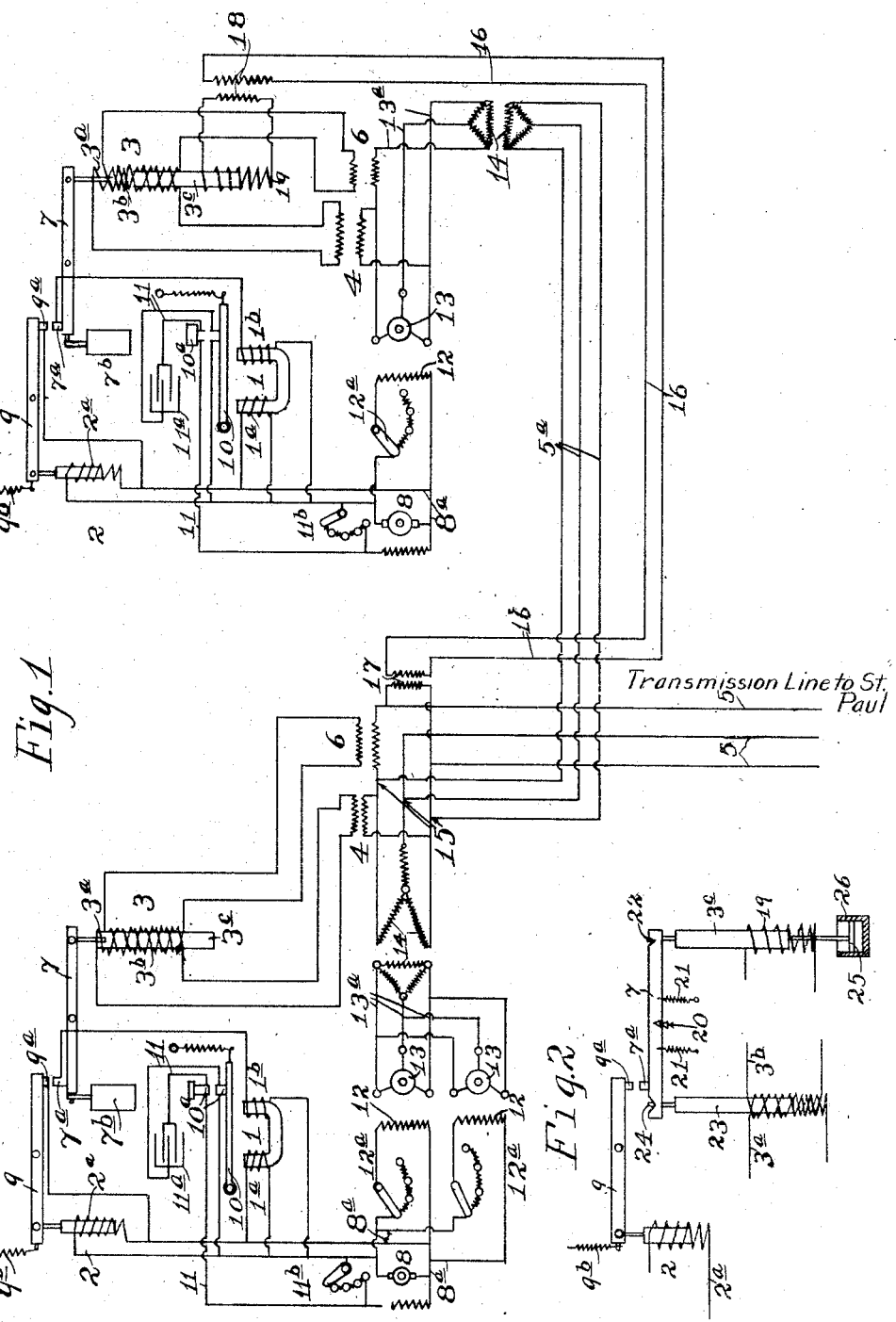
Witnesses:
Leon B. Losey.
L. L. Simpson.
Inventor
John Pearson.
By his Attorneys:
Williamson Merchant

UNITED STATES PATENT OFFICE.

JOHN PEARSON, OF SOMERSET, WISCONSIN, ASSIGNOR OF ONE-THIRD TO JAMES F. WILLIAMSON AND ONE-SIXTH TO FRANK D. MERCHANT, OF MINNEAPOLIS, MINNESOTA.

MEANS FOR AUTOMATICALLY CONTROLLING VOLTAGE AND POWER FACTOR OF GENERATORS OPERATING IN MULTIPLE.

No. 887,222.    Specification of Letters Patent.    Patented May 12, 1908.

Application filed March 1, 1906. Serial No. 303,639.

*To all whom it may concern:*

Be it known that I, JOHN PEARSON, a citizen of the United States, residing at Somerset, in the county of St. Croix and State of Wisconsin, have invented certain new and useful Improvements in Means for Automatically Controlling Voltage and Power Factors of Generators Operating in Multiple; and I do hereby declare the following to be a full, clear, and exact description of the invention, such as will enable others skilled in the art to which it appertains to make and use the same.

This invention relates to the regulation of voltage and power factor in electric generating and transmission systems, and has for its object to provide means for automatically controlling the fields of generators located in distant stations, in such manner that it is possible and practicable to operate the same in multiple when delivering electrical energy over the same transmission line.

Especially this invention relates to the interdependent control of a plurality of voltage regulators such as the General Electric type, with the said voltage regulators connected to regulate the fields of generators in different generating plants, whether in close proximity or at considerable distances apart, but particularly when the stations including such voltage regulators are far apart and where the percentage of drop in voltage of the one station varies greatly, with respect to that of the other station.

In the accompanying drawings, Figure 1 is a diagram showing the invention applied to a system involving two stations. Fig. 2 is a diagrammatic view of a modified form of voltage regulator.

As preliminary to further description of my invention, it is advisable first to consider a generating and power transmitting system including a General Electric Company's voltage regulator, such as generally installed by that company and generally known as the Tirrill voltage regulator, and to which system I have applied my automatic controller, for the purpose of operating in multiple voltage regulators of two distant generating plants with the generators operating in multiple and delivering energy to the same power transmission line.

An early form of the present generally used or standard Tirrill voltage regulator is disclosed in Letters Patent No. 725,800, issued to A. A. Tirrill of date April 21, 1903, and entitled "Automatic potential regulator."

The diagram view Fig. 1 at the left, shows the elementary connections of a General Electric voltage regulator, to two alternating generators and one exciter, the generators shown being of the three phase type. The regulator consists of a relay magnet 1, a direct current control magnet 12, and an alternating current control magnet 3. The A. C. magnet 3 has two windings $3^a$ and $3^b$ and a movable core $3^c$. The winding $3^a$ is a potential winding, which is connected, as shown, by means of transformer 4 across the A. C. bus bars or mains, of the power transmission line 5. An increase of potential will raise the core of this magnet 3, while a decrease of potential will lower the same. The compensating winding $3^b$ is connected, by means of the current transformer 6, to one of the bus bars or mains, of the power transmission line 5. The current in this winding $3^b$ flows in opposite direction to the current in the potential winding $3^a$, and demagnetizes the latter in direct proportion to the current flowing, and in this way the generator or bus bar voltage is raised, to automatically compensate for line transformer and secondary losses. This compensating winding $3^b$ can be adjusted for any line loss desired. However, with the compensating winding cut out the regulator will maintain a constant generator or bus bar voltage. The core $3^c$ of the magnet 3 is connected to an intermediately pivoted lever 7 that carries the lower main contact $7^a$ and is subject to a weight $7^b$. The winding $2^a$ of the magnet 2 is connected across the bus bars $8^a$ of the exciter 8. The core of this magnet 2 is drawn downward by an increase of potential in the winding $2^a$ and is released and allowed to raise on a decrease of potential in the winding $2^a$. The core of the magnet 2 is connected to an intermediately pivoted lever 9 and carries the upper main contact $9^a$, at one end, directly overlying the contact $7^a$, and at its other end said lever is yieldingly drawn upward by a spring $9^b$.

The relay magnet 1 is differentially wound, having one winding $1^a$ permanently connected to the exciter bus bars $8^a$, and another winding $1^b$ connected in the same manner, except that its circuit is opened and closed by the main contacts $7^a$ and $9^a$. The effect of the winding $1^b$ is to demagnetize the winding $1^a$, when the main contacts $7^a$—$9^a$ are closed, thereby releasing the spring supported relay armature 10 and causing the same to close the relay contact $10^a$. The relay contacts $10^a$ open and close a shunt circuit 11, across the exciter field-rheostat $11^b$. The condenser $11^a$ serves to take up the arc, across the contacts $10^a$, when the shunt circuit is opened, by a separation of said contacts.

To secure the best results from this regulator, the generator field rheostats $12^a$, which are inserted in the generator field windings 12, would be all "turned out," as shown, and the exciter field rheostat $11^b$ should have sufficient resistance to lower the generator voltage to about forty percent. of normal, at minimum load. To do this, it would, in most cases, be necessary to turn the exciter field rheostat $11^b$ all "in", as shown. This regulator just described, acts only on the exciter field rheostat. The alternating current generators 13 are connected to the bus bars or mains of the transmission line 5, through a group of transformers 14.

We will suppose that the voltage regulator is in action, with rheostats adjusted as above stated, holding the bus bars, or generator voltage constant, and that a load is thrown on the alternating generators, which load would, of course, tend to lower the voltage. This, as is obvious, will weaken the A. C. control magnet 3, which would allow its core to be lowered. When the core of the magnet 3 lowers, it raises the main contact $7^a$ into engagement with the main contact $9^a$, which will, in turn, close the relay contacts $10^a$, and short circuit the exciter field rheostat $11^b$. This will raise the exciter voltage, almost instantly, until the generator voltage has been restored, and the core of the A. C. magnet 3 will cease its downward movement at this point. When this takes place, the lower main contact $7^a$ will have been raised a little; and at the instant it ceases its upward movement, the D. C. control magnet 2 will continue to open and close the main contacts $7^a$—$9^a$ very rapidly, and cause the relay contacts $10^a$ to open and close simultaneously. The continued opening and closing of the rheostat shunt circuit 11, by the relay contacts $10^a$, will cause, in rapid succession, slight weakening and strengthening of the D. C. control magnet 2, which will continue to open and close the main contacts $7^a$—$9^a$ and relay contacts $10^a$; and thereby maintain a new constant voltage on the exciter 8, until another disturbing factor has taken place on the generators.

The A. C. magnet 3 contributes no movement to the opening and closing of the main and relay contacts, except that as the generator voltage tends to be varied from some cause, its core would take a lower position, if the voltage of the generators tend to increase, and this, in turn, would lower the exciter voltage, because the D. C. magnet 2 would have to be weakened in order to open and close the contacts at the lowered position of the main contacts $7^a$—$9^a$. These contacts are, as is evident, of the class known as "floating contacts", and they usually raise about three thirty seconds of an inch in moving from "no-load" to "full-load" position, varying the exciter voltage from seventy to one hundred and thirty volts, in order to maintain the desired alternating voltage.

Considering now the action of the current winding $3^b$ of the magnet 3, it should be first stated that the effect of this winding is simply to demagnetize the potential winding $3^a$. The weakening of the potential winding $3^a$ by the current winding $3^b$, will become more or less in proportion to the current flowing out on the mains 5. If the load becomes greater, the current in this winding $3^b$ will be increased and will demagnetize the potential winding $3^a$ to a greater extent, and thereby cause the exciter voltage to raise, and in this way to maintain a constant voltage at the center of distribution (which center of distribution may be several miles away), thereby overcoming line, transformer and secondary line losses. In brief, the regulator short-circuits the exciter field rheostat, for a greater or shorter length of time, depending on the load and speed, as required to maintain the desired voltage at the center of distribution.

My present invention was primarily the result of the following conditions: A generating station at Apple River Falls, Wisconsin, known as the St. Croix station, transmits four thousand horse power of electrical energy to St. Paul, Minnesota, a distance of about twenty eight miles, and in this station, a General Electric type of voltage regulator, such as above described, has been used to regulate for voltage and to compensate for line losses, not only to St. Paul, but clear through to the consumer. The drop from no-load to full-load was approximately twenty three percent. and consequently, the bus bar voltage at the generating station had to vary twenty two percent., between zero and full-load. At Riverdale, Wisconsin, about six miles from the St. Croix station, is another generating station having approximately the same kind of equipment as the St. Croix station, but of much less capacity, the maximum output thereof being about one thousand horse power. It became desirable to connect the two stations in multiple, to-wit, the St. Croix station having a capacity of four thousand horse power and the Riverdale station having a capacity of one thousand horse power, to the same transmission line, to-wit, to the line, or mains, running into St. Paul. In order to have the voltage regulator at the Riverdale station work at all, it had to compensate for from zero to twenty three percent. line drop, on a load varying from zero to one thousand horse power. Under these conditions, the two voltage regulators of the two distant generating systems would operate in multiple when, and only when, each station carried the same ratio of its full load. For instance, if the St. Croix station carried fifty percent. of its full load, which would be two thousand horse power, then Riverdale would also have to carry fifty percent. of its full load, which would be five hundred horse power. But this is a condition which, in practice, can not be maintained, and consequently, the voltage regulators would not work together, and Riverdale regulator had to be cut out. A man had to be employed to regulate the fields of the generators, by adjusting the field rheostats 12$^a$. My invention meets the above conditions and makes it possible to control generators in distant stations, according to voltage and power factor changes in the transmission line to which they are connected.

I will now describe my invention as applied to the two generating stations, each involving a voltage regulator, as above described, and illustrated diagrammatically in Fig. 1; and for convenience will refer to the two stations as the St. Croix station and the Riverdale station. In this diagram view Fig. 1, the mains of the two stations are shown as connected at 15, so that both stations deliver to the main power transmission line 5. In my experiments up to the present time I have found that where two or more generating stations are run in parallel, the stations being some distance apart, and the one station larger than the other, as in the instance above illustrated, it is best to use the voltage regulator at the larger station, to-wit, the St. Croix station, to regulate purely for voltage at the St. Paul end or delivery end of the power transmission line, and to keep the voltage constant at that point, no matter how much the load may vary; and to make the voltage regulator at the smaller or Riverdale station, follow up the changes in the bus bar voltage at the St. Croix station or main station, so that the Riverdale regulator thereby becomes, to a certain extent, a power factor regulator. To do this, I connect a pressure circuit, to wit a pair of pressure wires 16 at the St. Croix station, to a step-down potential transformer 17, this transformer being, on the high tension side, connected to the high tension bus bars or mains of the St. Croix station. These pressure wires 16 are run to the Riverdale station where they connect to the high tension side of a transformer 18 which, as shown, is a potential transformer. The low tension side of this transformer 18 is connected to a coil or winding 19 that surrounds the lower portion of the core 3$^c$ of the A. C. control magnet 3 of the voltage regulator at the Riverdale station. This coil 19 has the same number of ampere turns as the potential winding 3$^a$ of said magnet 3, and is set just as far down and extends just as far below the lower part of said core, as the coil or winding 3$^a$ extends beyond the upper part of said core. The current in the coil 19 travels in opposite direction to the current in the coil or winding 3$^a$, and hence, the two coils 19 and 3$^a$ pull upon the core 3$^c$ in opposite directions. At present we will not consider the action of the current or compensating winding 3$^b$. The potential winding 3$^a$ of this control magnet of the voltage, or field current regulator, at the Riverdale station is, of course, connected to the mains or bus bars 13$^a$ of the generator at the Riverdale station, through the potential transformer 4. The coil 19 being connected to the pressure wire transformer 18, receives a voltage substantially equal to the bus bar voltage at the St. Croix station.

Operation: If the voltage in winding 3$^a$ equals the voltage in the coil 19, the core 3$^c$ will not move and the exciter voltage will not change. But suppose an increased load comes upon the St. Croix or main station, the voltage regulator at that station raises the bus bar voltage, and this raises the voltage in the pressure wires 16 and also in the coil 19, and thus causes the core 3$^c$ of the Riverdale voltage regulator to be lowered, and this, in turn, causes the exciter voltage to raise, and thereby the generator voltage, until a balance is reached between pressure wire coil or winding 19, and the generator potential coil 3$^a$ of the said Riverdale station. Now suppose some of the load drops off at the St. Croix station. This will cause the voltage regulator at that station to lower the voltage of said station, and this will cause less voltage on pressure wires 16 and pressure wire coil 19. This will allow the coil 3$^a$ of the voltage regulator at the Riverdale station to pull upward the core 3$^c$ and thereby lower the exciter voltage and, consequently, the generator voltage, at the Riverdale station, until a balance has been reached. The current winding 3$^b$ of the magnet 3 of the regulator at the Riverdale station, demagnetizes the potential winding 3$^a$ in proportion to the load, and thereby compensates for the drop in the transmission line, from the said Riverdale station to the points 15 at the St. Croix station, where the two transmission lines are joined. In this way, the "regulator" at the Riverdale station is made to follow up any changes made by the "voltage regulator" at the St. Croix station, and thus keep a high power factor on the system. Otherwise stated, the generator at the Riverdale station is caused to follow up and maintain the voltage of the generators of the St. Croix or main station, at the point of junction 15, of the transmission lines. Stated in another way, the two distant generating stations are caused to maintain the same voltage at the points where their transmission lines are joined.

As further illustration of the action of the automatic controller on the voltage regulators of the two stations, consider the generator at the Riverdale station energizing potential winding $3^a$, and the pressure wires 16 energizing the coil 19, with equal forces, but acting on the core $3^c$ in opposite directions—the result is zero. Consider the generator voltage at the Riverdale station to increase and the pressure wire voltage to remain constant, the result is no longer zero, and the core $3^c$ is drawn upward thus (through the voltage regulator already described) lowering the exciter voltage at the Riverdale station, and the exciter lowers the generator voltage, until it equals the pressure wire voltage. Consider the generator voltage at the Riverdale station as constant and the pressure wire voltage to be raised, the result is not zero and the core $3^c$ is drawn downward, thus causing the exciter voltage to raise; and the exciter voltage then causes the generator voltage to raise, until the two voltages are again equal. This will mean that the main contacts $7^a$—$9^a$ of the regulator at Riverdale have raised a little and that the exciter, and also the generator, are working with a higher voltage. The above conditions will be strictly correct both at the Riverdale station and at the junctions 15 of the transmission lines, provided no load was transmitted over the power line from the Riverdale station to the said junction 15. But as current, and consequently load, is coming on, there is a percentage drop in the voltage between the Riverdale station and the said junction of the two lines; and this percentage of drop is substantially proportional to the current flowing over the line and to the phase relation of current and voltage. But the current transformer 6 at the Riverdale station has, in its secondary, a current in step with and always in proportion to the current flowing in the main or bus bar, in which it is inserted. This proportional current flowing in the secondary of said current transformer, of course, also flows through the current winding $3^b$ to which it is connected, and as this current flows through the said winding $3^b$ in a direction opposite to the flow of the current from the potential transformer, in the potential winding $3^a$, it of course tends to demagnetize the said winding $3^a$, in direct proportion to the phase relation of the currents in the coils and the current flowing on the line. And this is so whether the load be inductive or non-inductive. In this way, the drop between the Riverdale station and the junction of the two lines at 15 is compensated for.

The ideal construction for an alternating current magnet to be used in a voltage regulator of the character above described is shown in Fig. 2. In this arrangement, the lever 7 is intermediately mounted on a knife edged fulcrum 20 and is subject to a pair of opposing balancing springs 21; the magnet core $3^c$ is connected to one end of said lever 7 by a knife edged connection 22; and in lieu of the weight $7^b$ a second magnet core 23 is connected to the other end of said lever 7 by a knife edged connection 24. The potential winding $3^a$ and the current winding $3^b$ are applied around the core 23, and the potential winding or coil 19 which is connected to the pressure wires 16 through the transformer 18, as already described, is applied around the core $3^c$. To prevent trembling and sudden movements of the two cores and connections which receive movements therefrom, a piston 25 which works in a dash pot 26 is, as shown, attached to the core $3^c$.

It will, of course, be understood that while my invention has been particularly described for use to automatically control the generators of stations that are a long distance apart, it is equally well adapted to control generators that are in close proximity to each other, but connected to deliver their energy to the same transmission line. Hence, it will be understood that the expression "distant stations" is used for the sake of convenience and is not intended as a limitation as to the distance between the several generators.

What I claim is:

1. The combination with several alternating electric power stations connected in parallel with the transmission line, each station including a voltage regulator, said voltage regulator at one station serving to determine the voltage on the main transmission line, and means for subjecting the voltage regulator at each other station or stations to the influence of the voltage of the transmission line at the point of junction of the line from the corresponding station with the transmission line.

2. The combination with main and supplemental alternating current generating stations, operating in synchronism and connected in parallel to a common transmission line, with the main station regulated to determine the voltage at the distributing end of the line, of a device responsive to voltage variations at the junction of the lines from the main and supplemental stations, and operating to control the supplemental station to secure delivery therefrom to the main line at the same voltage as from the main station, substantially as described.

3. The combination with main and supplemental alternating current generating stations, operating in synchronism and connected in parallel to a common transmission line, with the main station regulated to determine the voltage at the distributing end of the line, of electrical means disposed between the junction of the lines from the main and supplemental stations and said supplemental station responsive to voltage variations at said junction and operating to control the supplemental station, and secure delivery therefrom to the main line at the same voltage as from the main station.

4. The combination with several electrical generating plants, each having a voltage regulator and having generators arranged to deliver their energy to the same transmission line, one of said plants serving to determine the voltage on the transmission line, of inductive means for controlling the voltage regulators at the other plants in accordance with the voltage on the transmission line at the points of junction of the lines from the corresponding stations with the transmission line.

5. The combination with several alternating current power stations connected in parallel with a transmission line, each station including a voltage regulator and one station serving to determine the voltage on the transmission line, of an induction circuit connected between the voltage regulator at each of the other stations and the junction of the corresponding station line with the transmission line to control the several voltage regulators in accordance with the voltage of the transmission line at the points of junction.

6. The combination with several electrical generating stations having their generators arranged to deliver their energy to the same transmission line, and each station including a voltage regulator, of a pressure circuit receiving energy approximately at the point of junction of the station lines with the common transmission line, and a coil operative on the voltage regulator of one of the stations and receiving energy from the said pressure circuit, whereby said latter voltage regulator will be controlled according to the voltage and power factor variations on the common transmission line.

7. The combination with several electrical generating stations having their generators arranged to deliver their energy to the same transmission line, and each station including a voltage regulator of the Tirrill type, the said generating stations running in multiple, of a pressure circuit receiving energy approximately at the point of junction of the station lines with the common transmission line, and a coil receiving energy from said pressure circuit and acting in opposition to one of the controlling coils of the voltage regulator at one of the stations, whereby said latter voltage regulator will be controlled according to the voltage and power factor variations on the common transmission line.

8. The combination with several electrical power stations delivering their energy to the same power transmission line, each station including a voltage regulator and each regulator including a potential transformer and a current transformer, said two transformers having windings arranged to oppose each other in their action on the circuit closing devices of said regulators, of a controller for said voltage regulators comprising a potential winding arranged to act on the circuit closing devices of one of said voltage regulators in opposition to the potential winding thereof, and pressure wires connected to said potential winding by a potential transformer and connected to the common transmission line by a second potential transformer, substantially as described.

9. The combination with several electric generators delivering their energy to a common transmission line, of a voltage regulator for each generator, and a circuit receiving electric energy from the leading or main generator and influencing inductively the voltage regulators of the other generators so as to cause the same to follow the main or leading generator in respect to voltage variation, whereby uniform voltage will be delivered to the main line from all of said generators and cross currents between the several generators be prevented.

10. The combination with several electrical generating stations having their generators arranged to deliver their energy to the same transmission line, of a voltage regulator for each station, and a circuit receiving electric energy from the main station and influencing inductively the voltage regulators of the other stations, so as to cause the subsidiary generating stations to follow the main or leading station, in respect to voltage variation, whereby uniform voltage will be delivered to the main or transmission line from all of said stations and cross currents between the several stations be prevented.

In testimony whereof I affix my signature in presence of two witnesses.

JOHN PEARSON.

Witnesses:
 MALIE HOEL,
 F. D. MERCHANT.